United States Patent
Kelm

[11] 4,041,592
[45] Aug. 16, 1977

[54] MANUFACTURE OF MULTIPLE FLOW PATH BODY
[75] Inventor: Everett F. Kelm, Corning, N.Y.
[73] Assignee: Corning Glass Works, Corning, N.Y.
[21] Appl. No.: 660,879
[22] Filed: Feb. 24, 1976
[51] Int. Cl.² ........................... B23P 15/26; F28F 1/04
[52] U.S. Cl. ............................... 29/157.3 R; 138/115; 165/165; 165/166; 428/117
[58] Field of Search ................... 29/157.3 R; 165/165, 165/166; 65/33; 138/114, 115, DIG. 9; 428/117, 116, 118, 73

[56] References Cited
U.S. PATENT DOCUMENTS

| | | | |
|---|---|---|---|
| 3,111,982 | 11/1963 | Ulbricht | 165/166 |
| 3,176,387 | 4/1965 | Argueso, Jr. et al. | 29/DIG. 26 |
| 3,231,015 | 1/1966 | Koch | 165/166 |
| 3,430,694 | 3/1969 | Cardell | 165/166 |
| 3,451,473 | 6/1969 | Urie et al. | 165/166 |
| 3,887,741 | 6/1975 | Dwyer | 428/116 |
| 3,921,112 | 11/1975 | Broverman | 29/157.3 R |
| 3,948,317 | 4/1976 | Moore | 165/165 |

Primary Examiner—Lowell A. Larson
Assistant Examiner—Daniel C. Crane
Attorney, Agent, or Firm—Richard N. Wardell; Clarence R. Patty, Jr.

[57] ABSTRACT

A heat exchange element, particularly suitable for use as a recuperator for external combustion engines, or a body for use as an afterburner or in filtration and osmosis, may be produced as a monolithic, ceramic, honeycombed body having a plurality of flow paths therethrough for two or three fluids wherein multiple flow paths of separate fluids are separated by walls which may be less than 10 mils thick.

In a preferred method, a honeycombed ceramic body is provided with a plurality of open-ended cells extending from one face end to another face end and arranged in vertical columns of cells separated by vertical fluid barrier wall surfaces. Selected columns of open-ended cells are closed on both face ends of the body and entrance to and exit from the selected cells is provided by removing portions of cell walls near face ends of the body between fluid barrier wall surfaces. A first fluid may enter the selected columns of cells through inlet openings on the top or bottom of the body and exit from the other end of the body through outlet openings. A second fluid may pass through unselected columns of cells. Three fluids may be accommodated by dividing the honeycombed body into independent upper and lower halves separated by an intermediate fluid barrier.

Fluids are applied to the heat exchanger and removed therefrom through appropriate use of sealable header or flue assemblies communicating with all entrance or exit openings.

10 Claims, 6 Drawing Figures

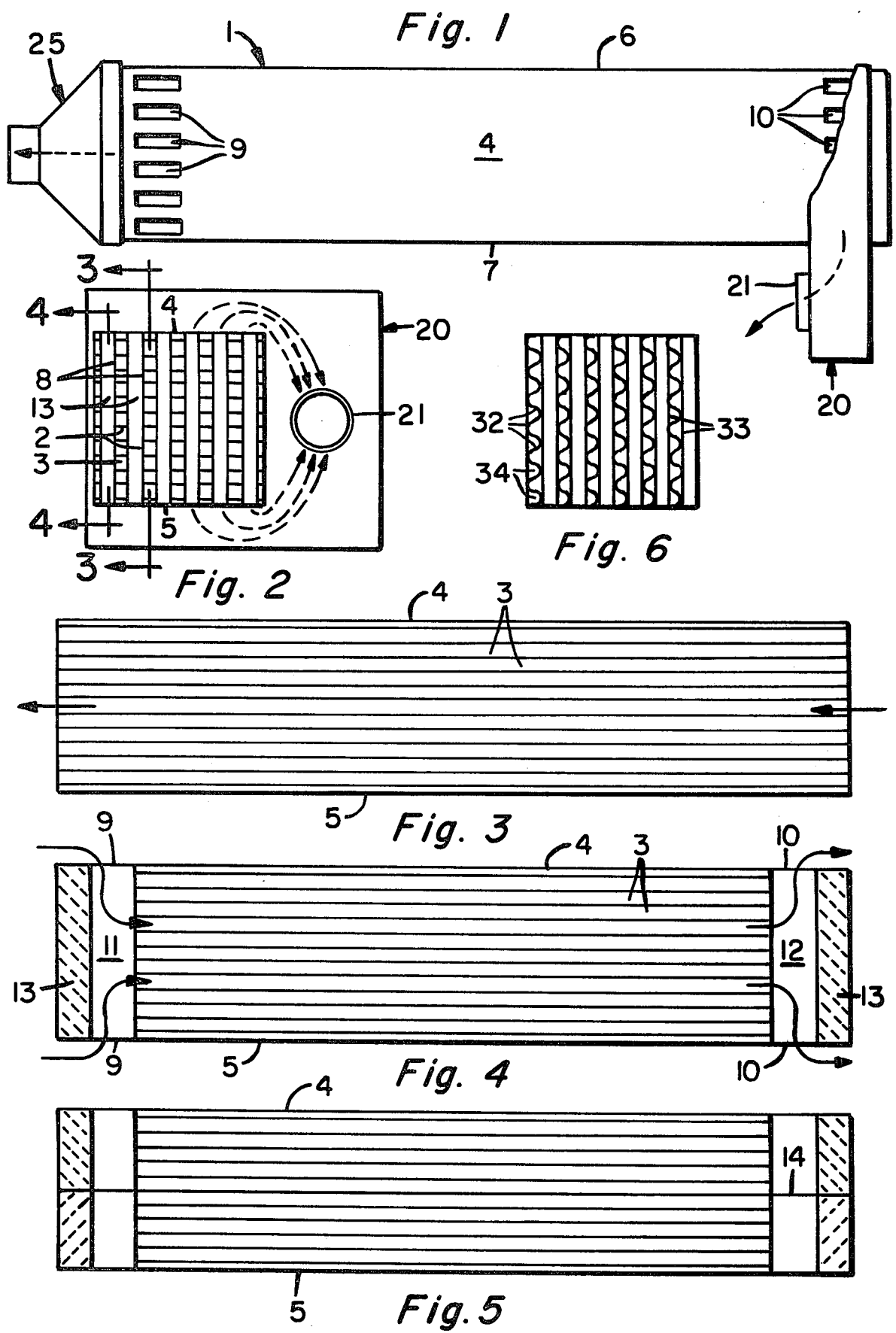

MANUFACTURE OF MULTIPLE FLOW PATH BODY

BACKGROUND OF THE INVENTION

The invention relates in particular to a fixed recuperative heat exchange device or use in turbine or Stirling cycle engines.

In a gas turbine engine, an air-fuel mixture is burned in a combustion chamber to form hot gases which are directed to a turbine wheel to produce rotary motion of an engine output shaft. After these gases have impinged upon the turbine wheel, and prior to their being exhausted from the engine, it is desirable to extract as much heat energy as possible. The efficiency of the gas turbine engine is increased by transferring the heat energy extracted from these exhaust gases to the compressed intake air prior to its mixture with the fuel and entry into the combustion chamber. One type of heat exchanger that is used to accomplish this energy transfer and raise the temperature of the incoming compressed air is called a rotary regenerator.

This heat exchange system which employs a rotating cylindrically shaped regenerator core has in the past been found to be suitable for gas turbine engines. Typically, the regenerator core is made from a ceramic material and is porous to gases which flow substantially parallel to the rotational axis of the core. The porous, ceramic regenerator core rotates in a housing that is divided into a plurality of passages. Hot exhaust gases and the cooler compressed imcoming air pass through these passages and through the porous regenerator core. The exhaust gases heat the regenerator core and the regenerator core, in turn, transfers this absorbed heat energy to the cooler compressed incoming air. In this manner, heat transfer results.

As is evident, this type of rotary regenerator unfortunately requires many accessory items to function properly, such as, drive mechanisms, motors and annular ring gears for rotating the core and rubbing seals and special housings for sealing the different sections of the core and the entire core from the rest of the engine. Additionally, material requirements of thermal shock resistance, light weight, rigidity against fluid pressure, strength for rotation drive and sealability severely reduce the field of candidate materials for regenerator use.

The present invention is concerned with a fixed recuperator which does not require movement and therefore does not require te use of all the accessories named. It also enlarges the field of possible materials by eliminating some physical property requirements.

Metal recuperators of the type have been used in the past, for example see U.S. Pat. No. 3,322,189, but they are not capable of being used in very high temperature environments, are difficult and expensive to build, and are cumbersome and inflexible in design, particularly with regard to the flow path of the fluids.

In general, the multiple flow path body of present invention may be used as a recuperator as mentioned above or as a heat exchanger or afterburner to reduce energy requirements for maintaining combustion in industrial ovens for baking, oxidizing, polymerizing or removing coatings, in organic waste incinerators, in foundry cupulos, and in internal combustion engines. In addition to operating as a heat exchanger, it may also be used in filtration and osmosis when porous materials are used to produce the honeycombed body.

SUMMARY OF THE INVENTION

It is an object of the present invention to provide a method of easily fabricating a heat exchange, filtration or osmosis device having a plurality of closely adjacent flow paths for multiple fluids.

It is another object of the present invention to provide such a method which allows extreme design flexibility with regard to the modification of a state of the art, laid-up or extruded honeycombed body having a multiplicity of open-ended cells extending therethrough.

It is a further object of the invention to provide a fixed heat exchanger or recuperator which has improved monolithic honeycomb design for improved flow of heat transferring or heat absorbing fluids.

In accordance with the objectives, the invention is a method for fabricating a multiple flow path body having a plurality of contiguous flow paths for the exchange of energy or matter between two fluids or the filtering of a fluid between flow paths. The invention further includes one particularly advantageous heat exchange device produced by the method.

The method comprises the steps of:

a. providing a honeycombed body having a matrix of thin walls defining a multiplicity of open-ended cells extending from one face end thereof to another face end thereof and being bounded on sides generally parallel to cell axes by generally opposed upper and lower boundary surfaces connected by oppposed first and second side boundary surfaces, the cells being grouped into a plurality of columns of cells, each column being separated from adjacent columns of cells by a fluid barrier wall surface extending continuously from the upper boundary surface to the lower boundary surface and from the one face end of the honeycombed body to the other face end thereof, b. providing an entrance for a first fluid into selected columns of cells near one face end of the honeycombed body and an exit for the first fluid out of the selected columns of cells near the other face end thereof by forming openings in the upper boundary surface, the lower boundary surface, or both the upper and lower boundary surfaces, c. forming entrance and exit fluid flow grooves from entrance and exit openings, respectively, to open-ended cells in the selected columns of cells by removing portions of cell walls joining opposed fluid barrier wall surfaces near face ends in the selected columns of cells, and d. sealably enclosing entrance and exit fluid flow grooves near face ends of the honeycombed body to form, respectively, entrance and exit fluid flow conduits, such that first fluid flow paths are formed from the first fluid entrance through the entrance fluid flow conduit, the cells in the selected columns of cells, the exit fluid conduit, and to the first fluid exit, and second fluid flow paths are formed through cells in unselected columns of open-ended cells.

A novel fixed heat exchange device produced by the method comprises:

a. a monolithic, honeycombed body having a matrix of thin walls forming a multiplicity of substantially parallel cells extending therethrough between opposed face ends and being bounded on sides generally parallel to cell axes by opposed upper and lower boundary surfaces and opposed first and second side boundary sufaces connecting upper and lower boundary surfaces, i. the cells being grouped into a plurality of columns of cells, each column being separated from adjacent columns of cells by a fluid barrier wall surface extending continuously from the upper boundary surface to the lower boundary surface and from one face end of the honeycombed body to the other face end thereof, ii. selected columns of cells being closed against fluid passage through cells of the column on both face ends of the honeycombed body while the cells of unselected columns of cells are open-ended, and iii. the honeycombed body further having openings in the upper and lower boundary surfaces near face ends of the honeycombed body into the selected columns of cells and fluid flow conduits, each conduit extending from one of the openings in the upper boundary surface to one of the openings in the lower boundary surface between opposed fluid barrier wall surfaces in the selected columns of cells, thereby providing, in the body, first fluid flow paths though the boundary surface openings and the fluid flow conduits to cells in the selected columns of cells near the one face end of the honeycombed body, through the cells, and from the cells in the selected columns of cells through the fluid flow conduits and the boundary surface openings near the other face end of the honeycombed body;

b. means sealably fixed to the honeycombed body for communicating a first fluid to the openings in the upper and lower boundary surfaces at the one face end of the honeycombed body, and c. means sealably fixed to the honeycombed body for recovering the first fluid from the openings in the upper and lower boundary surfaces at the other face end thereof.

The novel fixed recuperator is produced according to one alternative of the method by providing openings in both the upper and lower boundary surfaces at entrance and exit ends thereby providing first fluid flow paths which resemble a reclining T with the entrance and exit fluid flow conduits tracing out the horizontal upper and lower bars of the I and the open-ended cells tracing out the connecting vertical body of the letter I. Other alternatives of the method result in flow paths resembling a reclining Z by providing entrance openings in only one of the upper or the lower boundary surfaces and exit openings only in the boundary surface opposed to the entrance openings. Further, a flow path resembling a U or an inverted U results from providing both entrance and exit openings in only one of the upper or lower boundary surfaces.

Delivery of the first fluid from a first fluid source to the first fluid entrance openings and recovery of the first fluid from first fluid exit openings is provided by first fluid entrance and exit headers or flues sealed to the honeycombed body and enclosing, respectively, entrance and exit openings. Delivery and recovery of a second fluid may be provided by second entrance and exit flues sealably enclosing both selected closed cells and unselected open-ended cells on opposed end faces of the honeycombed body. Countercurrent flow is preferred so that the first fluid entrance and the second fluid exit would occur at the same end of the honeycombed body and the first fluid exit and the second fluid entrance would occur at the other end of the honeycomed body.

A further alternative of the inventive method comprises a further step of providing the honeycombed body with a fluid barrier surface extending between face ends and opposed sides of the honeycombed body intermediate and generally opposed to the upper and lower boundary surfaces. Entrance and exit openings are then provided through both upper and lower boundary surfaces such that paths for three fluids are provided. First and third fluids may flow in U- and inverted U-shaped paths, respectively, and a second fluid may pass directly through unselected cells allowing appreciable exchange beween first and second and second and third fluids.

DESCRIPTION OF THE DRAWINGS

FIG. 1 is a top view of te multiple flow path body of the invention with only exit flues for first and second fluids sealably attached to ends of the honeycombed body. Similar entrance flues would normally be used in actual operation.

FIG. 2 is a face end view of the assembly of FIG. 1 but without the second fluid flue which would otherwise enclose the face end in actual use.

FIG. 3 is a cross-sectional view cut through an unselected column of open-ended cells of FIG. 2 through which the second fluid may flow.

FIG. 4 is a cross-sectional view cut through a selected column of cells, the fluid conduits, and the end seals of FIG. 2 and showing the paths through which the first fluid may flow.

FIG. 5 is a cross-sectional view of an alternative fabrication wherein the cross-section is taken through a selected column of cells and wherein an intermediate fluid barrier surface parallel to the upper and lower boundary surfaces separates the honeycombed body into upper and lower units for separate flow of two fluids in selected cells.

FIG. 6 is a face end view of an alternative honeycomb element wherein the honeycombed body is a laid-up structure rather than an extruded structure as in FIG. 2.

DETAILED DESCRIPTION OF THE INVENTION

Looking at FIGS. 1 and 2, the multiple flow path body of the invention is shown as a honeycombed body 1 with first fluid exit flue 20 and second fluid exit flue 25. Similar entrance flues on ends opposite the exit flues have been omitted for clarity. Choice of parallel or countercurrent flow of the two fluids determines whether first and second fluids enter at the same end or at opposite ends of the honeycombed body but the preferred countercurrent flow design is primarily described herein and is shown by the solid and broken arrows in the views.

The honeycombed body is an extruded body having thin cell walls 2 forming an array or matrix of square cells 3 extending the length of the body from one face end shown in FIG. 2 to the other face end at the opposite end of the body. The honeycombed body is bounded by cell walls or a separate skin forming an upper boundary surface 4, lower boundary surface 5 and opposed first and second side surfaces 6, 7, in this case forming a body with a rectangular (square) cross-section. The cells are grouped into columns of cells which are separated from adjacent columns of cells by fluid barrier wall surfaces 8. The fluid barrier wall surface may be a composite of the thin walls of the cells in the column, as shown, or a separate wall may be formed. It is preferred, though not necessary, that the cell walls and fluid barrier wall surface be planar and parallel to one another; however, it is only necessary that columns of cells be separate from adjacent columns for independent flow of fluids. Methods of fabricating laid-up and extruded type structures are exemplified by the disclosures of U.S. Pat. Nos. 3,112,184 and 3,790,654, which are incorporated herein by reference.

Entrance openings 9 and exit openings 10 are provided through upper boundary surface 4 and through lower boundary surface 5 into selected columns of cells. Openings in only one surface would provide a U-shaped flow path for the first fluid; entrance openings in one surface and exit openings in the opposed boundary surface would provide a Z-shaped flow path; and entrance and exit openings in both surfaces, as shown in the Figures, would provide an I-shaped flow path. Every other column of cells may be selected as shown in the Figures, giving a ratio of selected cells for the first fluid flow to unselected cells for second fluid flow of 1:1, or some other pattern of selections may be made giving other first fluid cell to second fluid cell ratios, such as 1:2 or 2:1, usually for providing for different quantities or pressure drop of first and second fluids passing through the honeycombed body.

The first fluid is applied to first fluid entrance openings and recovered from first fluid exit openings by means of the first fluid entrance and exit flues 20 which are sealably attached to the honeycombed body. A metal flue may, for example, surround a ceramic honeycombed body and be sealed against a hot gas escape by means of asbestos or insulating refractory wool between the body and the flue. The flue 20 includes hole 21 for connecting to a fluid source (not shown) or to a fluid exhaust (not shown). The paths of the fluid from exit openings to the flue hole 21 are shown by the dotted arrows in FIG. 2. Other flues, headers, or manifolds which are known in the art for delivering and recovering fluids are equally useable with the multiple flow path body.

The second fluid may be applied and recovered from unselected cells at face ends of the honeycombed body by means of second fluid entrance and exit flues 25 which are sealed to the multiple flow path body in any convenient manner such as than suggested for the first fluid flues.

Open-ended cells for the passage of the second fluid appear in cross-section in FIG. 3 showing a section of the honeycombed body of FIG. 2 through an unselected column of cells. The fluid may enter and pass, as shown by the arrows, through any or all of the cells 3 in unselected columns when applied to the face end of the honeycombed body by the second fluid entrance flue.

FIG. 4 is a cross-sectional view of the honeycombed body of FIG. 2 showing the first fluid paths through cells of selected columns of cells. The fluid enters the honeycombed body through the entrance openings 9 in both upper and lower boundary surfaces 4, 5 and passes into entrance fluid conduit 11 which extends in each selected column of cells between fluid barrier wall surfaces and upper and lower boundary surface openings 9. The entrance fluid conduit give the first fluid access to all the cells of the selected column so that multiple flow paths are available through the cells 3 to the other (exit) end of the body.

Near the other face of the body, the first fluid passes out of the cells 3 and into an exit fluid conduit 12, which extends in each selected column of cells between fluid barrier wall surfaces and exit openings 10 in upper and lower boundary surfaces 4, 5, thence out of the honeycombed body through the exit openings to be recovered by the first fluid exit flue.

The fluid conduits 11, 12 are produced near face ends of the honeycombed body by forming fluid flow grooves between upper and lower boundary surfaces by removing portions of cell walls joining the opposed fluid barrier wall surfaces in selected columns of cells. This may be accomplished, for example, by drilling, punching or sawing from upper or lower boundary surfaces sequentially through one boundary surface, the cell walls and through the opposed boundary surface, in which case the entrance and exit openings are made in the boundary surfaces at the same time. In the alternative, the fluid flow grooves and entrance and exit openings may be made by sawing cell walls and boundary surfaces from each face end toward the other face end parallel to and between the barrier wall surfaces in the selected columns.

To transform the fluid grooves into fluid conduits and to prevent flow of the second fluid into selected columns of cells, the fluid grooves are enclosed near face ends of the honeycombed body between the fluid barrier wall surfaces along the length of the fluid flow grooves in selected columns of cells. The groove may be enclosed by sealing with ceramic slip, ceramic cement, wax, plastics, rubber, or any other material which is compatible with the honeycombed body, essentially non-porous, and which will be chemically, mechanically and thermally resistant to the fluid and atmosphere during use. Compatibility includes considerations of the thermal expansion for high temperature use.

As shown in FIG. 4 the sealing material 13 is forced into selected columns at a depth less than the depth of the fluid flow grooves. The sealing material may be advantageously urged into these columns as a fluid using a method disclosed and claimed in a co-pending application Ser. No. 660,880, which is incorporated herein by reference, filed on even date with this application in the name of D. A. Noll, et al. and assigned to the assignee of this application.

FIG. 5 shows a cross-sectional view through a selected column of cells in an alternative multiple flow path body. The body is similar to that of FIG. 4 but has an intermediate fluid barrier 14 generally parallel to the upper and lower boundary surfaces 4, 5 extending from the first side to the second side and from the one face end to the other face end of the body. This intermediate barrier essentially separates the body into upper and lower units and allows first and third fluids to flow separately through selected columns of cells in upper and lower units while not affecting the flow of the second fluid through unselected cells in both upper and lower units.

FIG. 6 shows the face end view of a laid-up honeycombed body which is fabricated by stacking alternate layers of flat 33 and corrugated 32 sheets of green ceramic material. Rounded cells 34 are grouped in columns by the flat walls 33 which act as fluid barrier wall surfaces. Alternate selected columns of cells are sealed.

EXAMPLE OF THE PREFERRED EMBODIMENT

The honeycombed body of the invention may be made of metal, plastic or ceramic materials, the latter group being preferred and being exemplified by a family of low expansion cordierite materials disclosed in U.S. Pat. No. 3,885,977 and useful in high temperature recuperators of the present invention. Ceramic or metal powders and heat-softened plastics are preferably extruded as plastically deformable batches into monolithic honeycombed bodies in the manner disclosed in previously incorporated U.S. Pat. No 3,790,654.

A honeycombed ceramic body may be extruded according to the teaching of previously incorporated U.S. Pat. No. 3,790,654 using a cordierite composition similar to body F of U.S. Pat. No. 3,885,977. The low expansion cordierite has a chemical composition of 49.6% $SiO_2$, 35.9% $Al_2O_3$, and 14.5% $MgO$ and is useful in moderately high temperature applications (below about 1500° C.).

Such a body as above described may be tested as a heat exchanger (recuperator) using hot-burned natural gas as the first fluid and cold blown air as the second fluid. A 2-inch square, sintered cordierite body, 20 inches long and having about 225 square cells per square inch with 10 mil thick walls separating the cells may be modified according to the invention by cutting the upper and lower surfaces and horizontal cell walls from face ends to a depth of about one inch between vertical cell walls in alternate columns of cells and ten cementing the face end of the body in the selected columns of cells to a depth of about ⅛ inch with high temperature ceramic cement. The cement may then be sintered and a metal air flue attached at each end of the body and sealed to the body with refaractory wool fiber to provide a means of applying the hot gases to the first fluid flow paths through the honeycombed body.

Using the above model, hot air may enter the first fluid entrance openings at about 800°-850° C while a stream of cold air is directed toward the entire face end and enters the open-ended cells at the other end of the body at about 20°-25° C. The fluids pass in countercurrent fashion through the body and may be collected at opposite ends when the temperature of the "hot" gas is 30°-60° C and the temperature of the "cold" air is 400°-450° C. Flow rates may be adjusted to provide for different temperatures at the exit ends but the above data are representative of the magnitude of heat exchange that may take place over a short path length.

In accordance with an improved sealing method disclosed and claimed in the previously noted copending D. A. Noll, et al. application, all the cells on each face end of the honeycombed body may be sealed by dipping the body into a heat-softened thermoplastic material. Thereafter, the body is cooled and selected columns of cells may be cut, in the process removing the stiff thermoplastic material and portions of the cell walls and boundary surfaces from the selected columns. The body is then re-dipped into a final commercially available high-temperature cement sealing material and the cement is sintered while the thermoplastic material is removed from the remaining cells by a heat treatment. Alternatively, the fluid flow grooves may be formed before the wax dip, after which the fluid wax may fill all the cells and then be selectively blown out of the selected columns. The remaining wax is then allowed to cool and the body is dipped into the final cement and the cement sintered.

I claim:

1. The method of fabricating a multiple flow path body having a plurality of contiguous flow paths extending therethrough for separate fluid flow, the method comprising the steps of
   a. providing a honeycombed body having a matrix of thin walls defining a multiplicity of open-ended cells extending from one face end thereof to another face end thereof and being bounded on sides generally parallel to cell axes by generally opposed upper and lower boundary surfaces connected by first and second side boundary surfaces, the cells being grouped into a plurality of columns of cells, each column being separated from adjacent columns of cells by a fluid barrier wall surface extending continously from the upper boundary surface to the lower boundary surface and from the one face end of the honeycombed body to the other face end thereof,
   b. removing portions of at least one of the upper and lower boundary surfaces and portions of the cell walls joining opposed fluid barrier wall surfaces in selected columns of cells near at least one face end of the honeycomed body to provide, respectively, fluid openings in the boundary surface or surfaces and fluid flow grooves extending from the openings and face end to cells in the selected columns, and
   c. sealably enclosing the fluid flow grooves near a face end of the honeycombed body to form fluid flow conduits, such that first fluid flow paths are formed from the openings through the fluid flow conduits and the cells in the selected columns of cells to the other open ends thereof; and second fluid flow paths are formed through open-ended cells in unselected columns of cells.

2. The method of fabricating a multiple flow path body having a plurality of contiguous flow paths extending therethrough for separate fluid flow, the method comprising the steps of
   a. providing a honeycombed body having a matrix of thin walls defining a multiplicity of open-ended cells extending from one face thereof to another face end thereof and being bounded on sides generally parallel to cell axes by generally opposed upper and lower boundary surfaces connected by first and second side boundary surfaces, the cells being grouped into a plurality of columns of cells, each column being separated from adjacent columns of cells by a fluid barrier wall surface extending continously from the upper boundary surface to the lower boundary surface and from the one face end of the honeycombed body to the other face end thereof,
   b. providing an entrance for a first fluid into selected columns of cells near one face end of the honeycombed body and an exit for the first fluid out of the selected columns of cells near the other face end thereof by forming openings in at least one of the upper boundary surface and the lower boundary surface,
   c. forming entrance and exit fluid flow grooves from the entrance and exit openings, respectively, to cells in the selected columns of cells by removing portions of the cell walls joining opposed fluid barrier wall surfaces near face ends in the selected columns of cells, and
   d. sealably enclosing entrance and exit fluid flow grooves near face ends of the honeycombed body to form, respectively, entrance and exit fluid flow conduits, such that first fluid flow paths are formed from the first fluid entrance openings through the entrance fluid flow conduit, the cells in the selected columns of cells, the exit fluid flow conduit, and to the first fluid exit openings; and second fluid flow paths are formed through open-ended cells in unselected columns of cells.

3. The method of claim 1 which includes sealably communicating all first fluid entrance openings and all first fluid exit openings to first fluid entrance and exit flues, respectively, and all open-ended cell openings in unselected columns of cells on the one face end of the honeycomb body and all open-ended cell openings in unselected columns of cells on the other face end thereof to second fluid exit and entrance flues, respectively.

4. The method of claim 1 wherein the honeycomb body is provided with a matrix of thin walls forming a regular array of open-ended cells having substantially parallel cell axes.

5. The method of claim 4 wherein the honeycomb body has a rectangular cross-section.

6. The method of claim 1 wherein the entrance openings are formed only in one boundary surface and the exit openings are formed only in the opposed boundary surface so that Z-shaped first fluid flow paths are formed.

7. The method of claim 1 wherein the entrance openings are formed only in one boundary surface and the exit openings are formed only in the same one boundary surface so that U-shaped first fluid flow paths are formed.

8. The method of claim 1 wherein the entrance openings and the exit openings are formed in both the upper and lower boundary surfaces so that I-shaped first fluid flow paths are formed.

9. The method of claim 1 wherein alternate columns of cells are selected.

10. The method of claim 1 including providing the hoenycomb body with an intermediate fluid barrier surface extending continously from one end face to the other end face and from the first side surface to the second side surface, the barrier surface being intermediate and substantially opposed to upper and lower surfaces, and wherein entrance and exit openings are provided in both the upper and lower boundary surfaces, so that separate upper and lower U-shaped fluid flow paths are formed through cells in selected columns of cells and three fluids may be separately accommodated through the honeycombed body.

* * * * *

UNITED STATES PATENT AND TRADEMARK OFFICE
CERTIFICATE OF CORRECTION

PATENT NO. : 4,041,592
DATED : August 16, 1977
INVENTOR(S) : Everett F. Kelm

It is certified that error appears in the above-identified patent and that said Letters Patent are hereby corrected as shown below:

Column 3, line 40, change "T" to -- I -- .

Column 4, line 14, change "te" to -- the -- .

Column 7, line 23, change "ten" -- then -- .

Signed and Sealed this

Tenth Day of January 1978

[SEAL]

Attest:

RUTH C. MASON
Attesting Officer

LUTRELLE F. PARKER
Acting Commissioner of Patents and Trademarks